No. 611,263. Patented Sept. 27, 1898.
F. LOUIS.
HOISTING OR LIFTING APPARATUS.
(Application filed Apr. 27, 1897.)
(No Model.) 7 Sheets—Sheet 3.

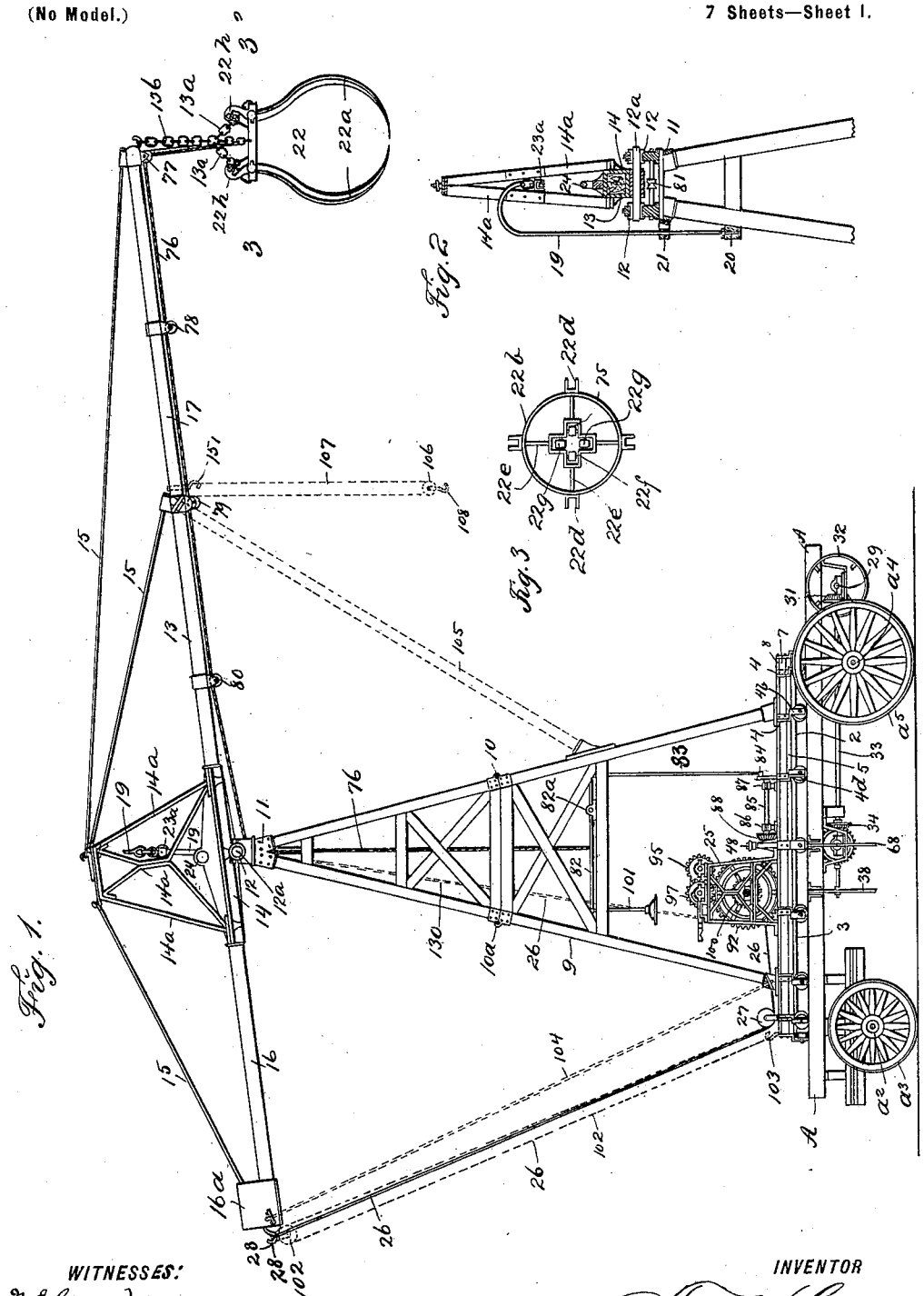

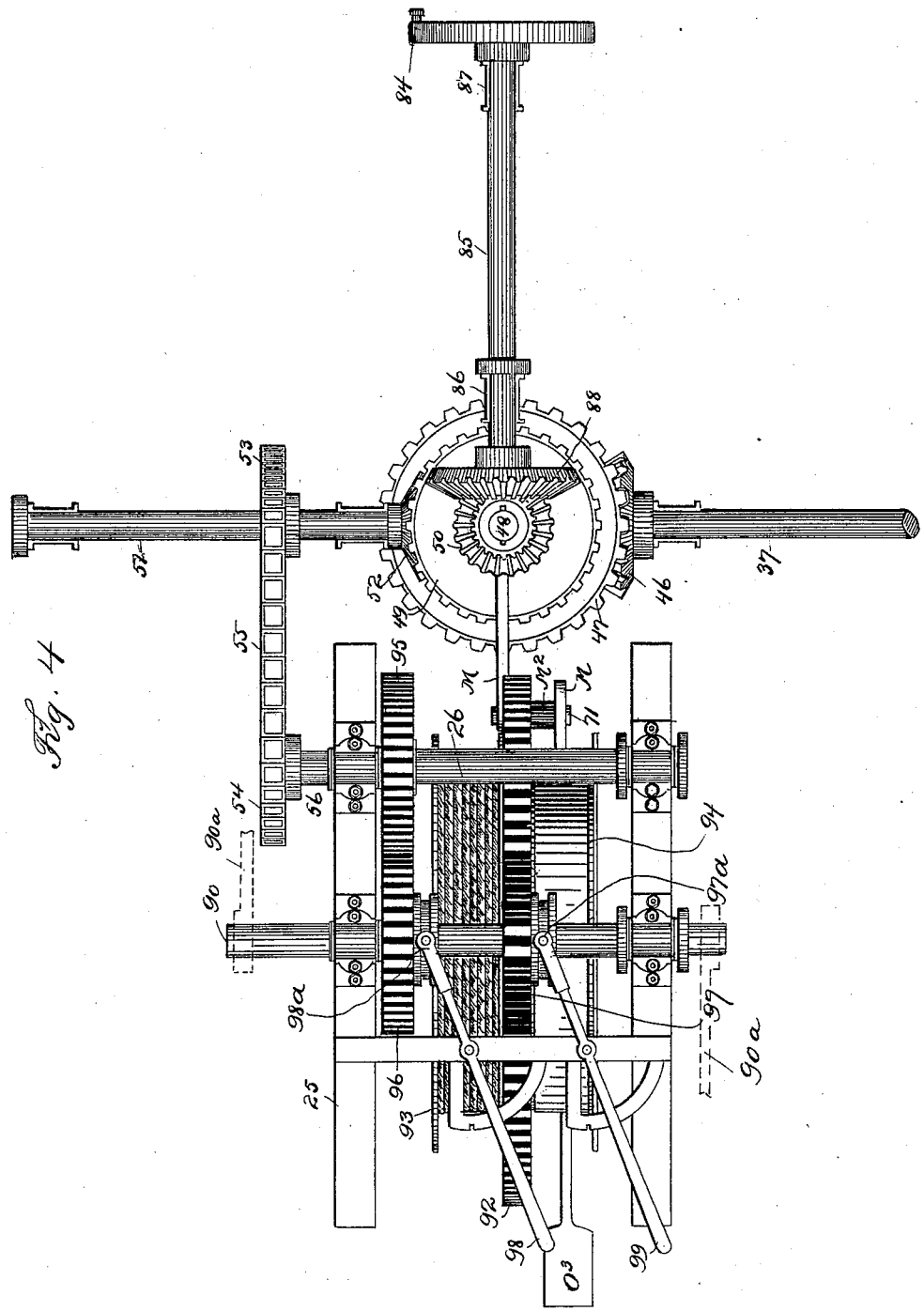

WITNESSES:
N. E. Greenidge
C Gersh

INVENTOR
Fedor Louis
BY
Edgar Tate
ATTORNEYS.

No. 611,263. Patented Sept. 27, 1898.
F. LOUIS.
HOISTING OR LIFTING APPARATUS.
(Application filed Apr. 27, 1897.)
(No Model.) 7 Sheets—Sheet 4.
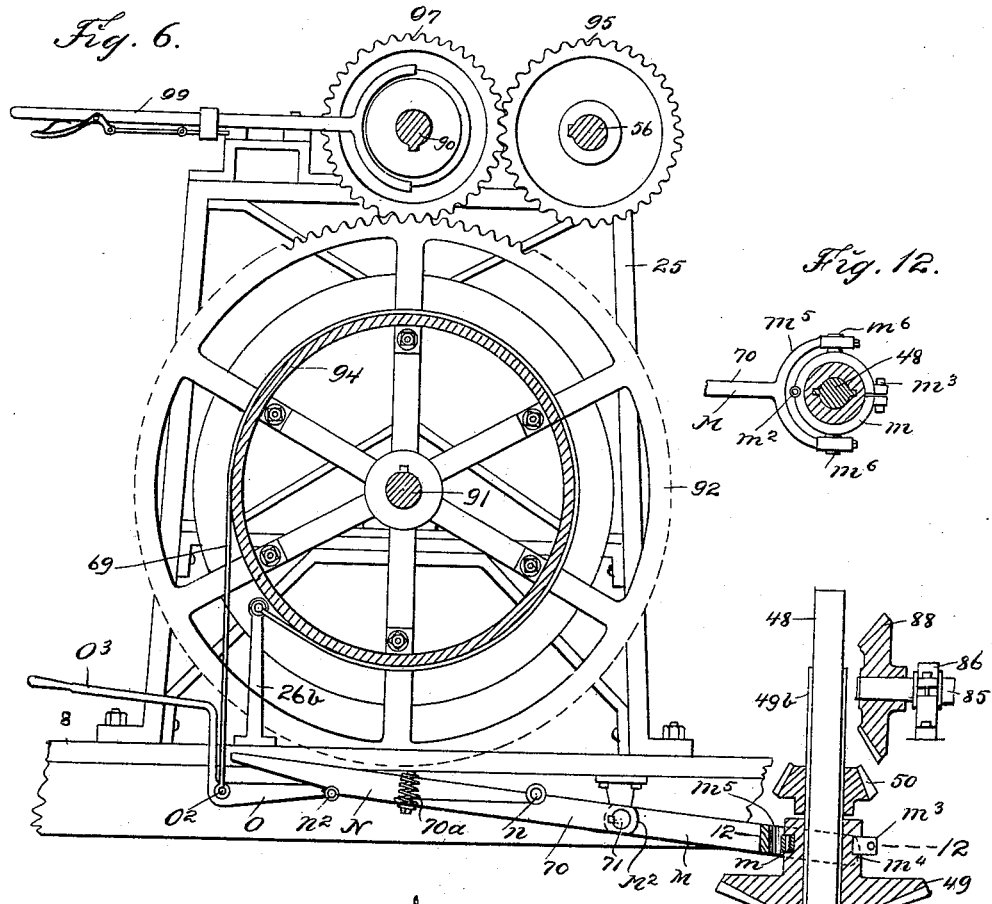
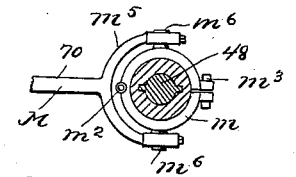
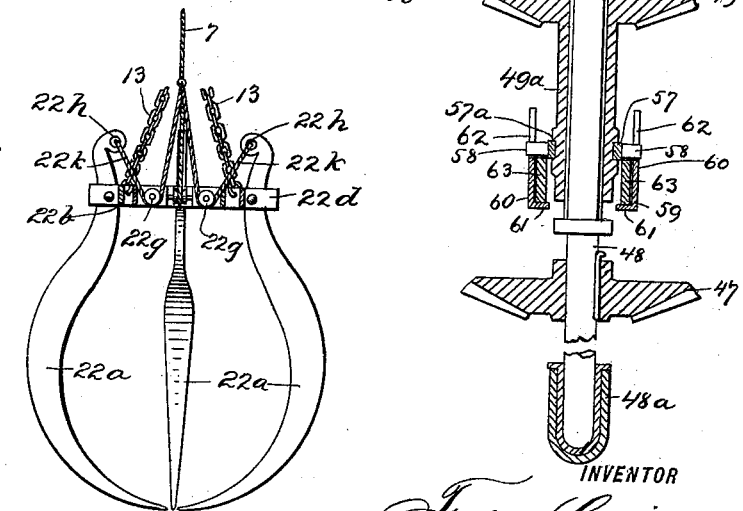
WITNESSES:
C. Nordfors
C. Gersh
INVENTOR
Fedor Louis
BY
Edgar Tate & Co.
ATTORNEYS.

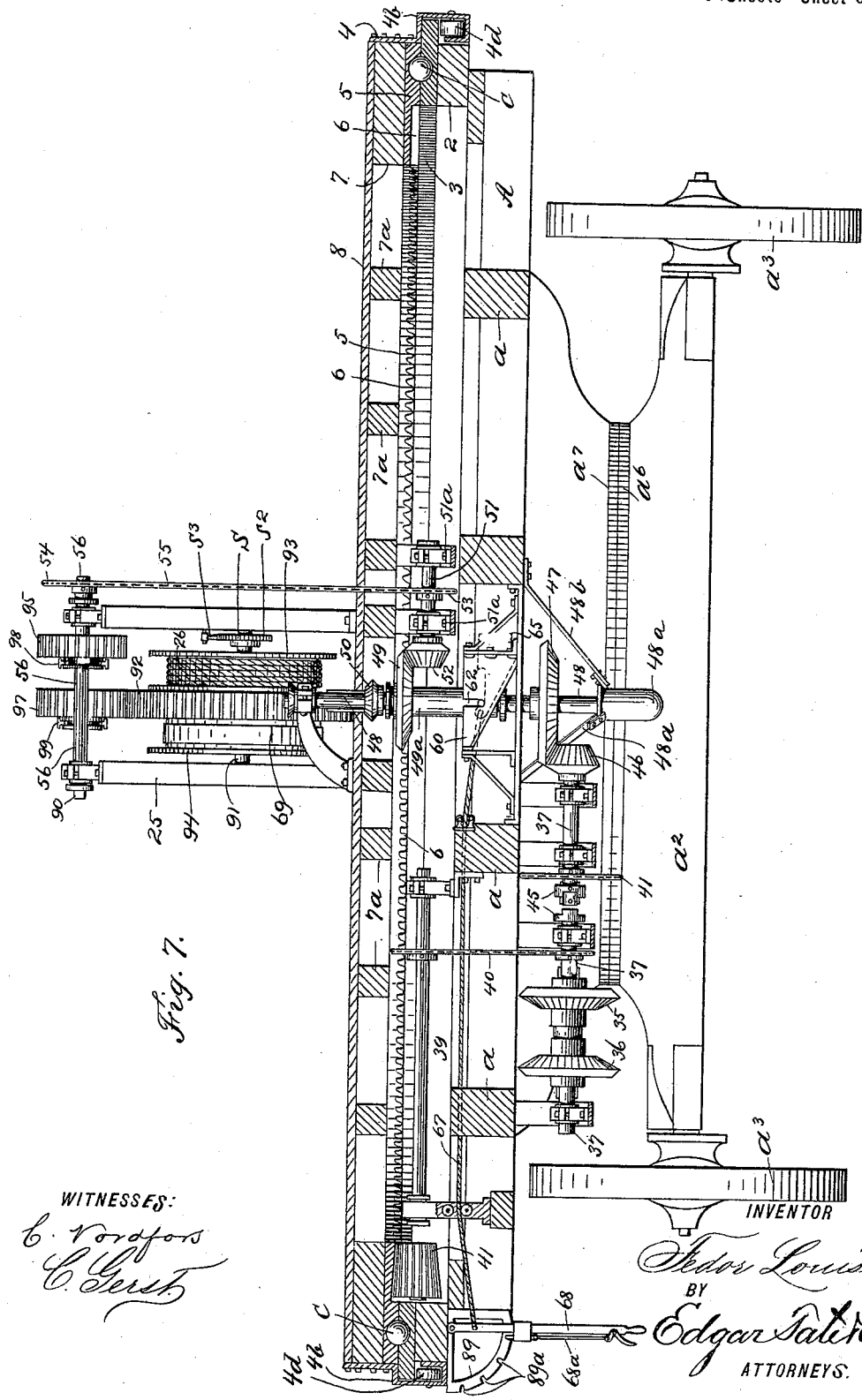

No. 611,263. Patented Sept. 27, 1898.
F. LOUIS.
HOISTING OR LIFTING APPARATUS.
(Application filed Apr. 27, 1897.)
(No Model.) 7 Sheets—Sheet 6.

WITNESSES:
C. Nordfors
C. Gerst

INVENTOR
Fedor Louis
BY
Edgar Tate & Co
ATTORNEYS.

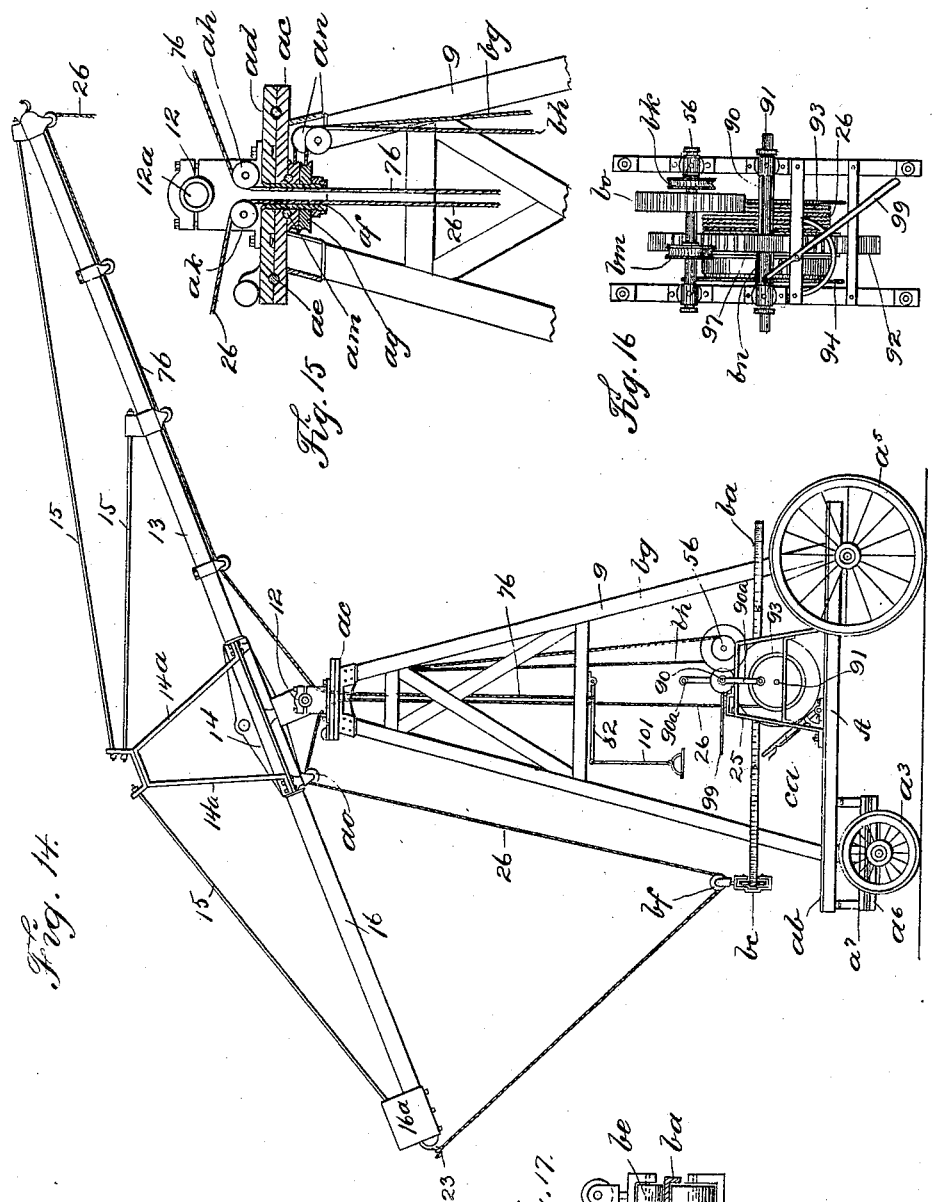

UNITED STATES PATENT OFFICE.

FEDOR LOUIS, OF NEW YORK, N. Y.

HOISTING OR LIFTING APPARATUS.

SPECIFICATION forming part of Letters Patent No. 611,263, dated September 27, 1898.

Application filed April 27, 1897. Serial No. 634,099. (No model.)

*To all whom it may concern:*

Be it known that I, FEDOR LOUIS, a subject of the Emperor of Germany, residing at New York, (Brooklyn,) in the county of Kings and State of New York, have invented certain new and useful Improvements in Hoisting or Lifting Apparatus, of which the following is a full and complete specification, such as will enable those skilled in the art to which it appertains to make and use the same.

This invention relates to portable folding and lifting cranes; and the object thereof is to provide an improved device of this class which is adapted to be used wherever such devices are applicable, a further object being to provide a lifting-crane of improved construction which is particularly adapted for use in handling or stacking hay, straw, and other and similar farm products, but which may be used wherever it is desired to raise an article or articles to an elevated position or to remove said article or articles from one point to another, a further object being to provide an improved device of the class herein specified which is simple in construction and operation and which is adapted to be operated by hand by two persons, whereby a great saving of time and labor is effected, and which when operated by power—such as steam-power, an electrical motor, or other power apparatus— may be managed by a single person.

The invention is fully disclosed in the following specification, of which the accompanying drawings form a part, in which the separate parts of my improvement are designated by the same letters and numerals of reference in each of the views, and in which—

Figure 5:
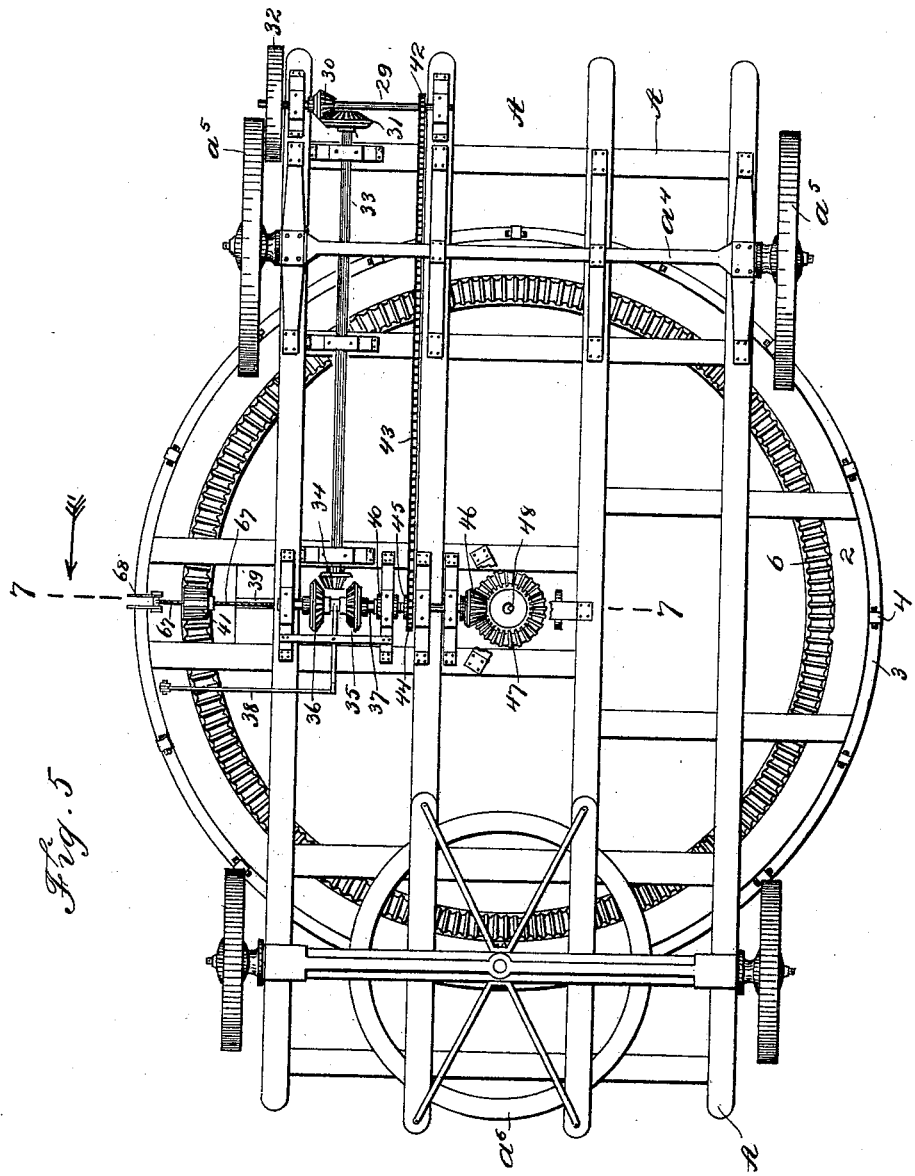
Figure 8:
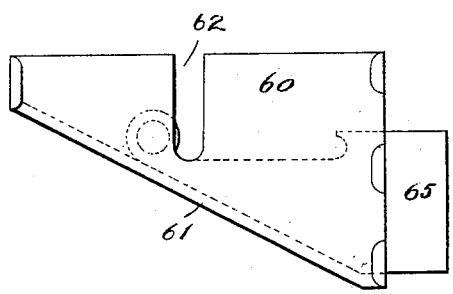
Figure 9:
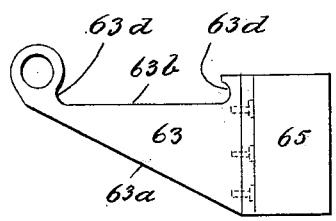
Figure 10:
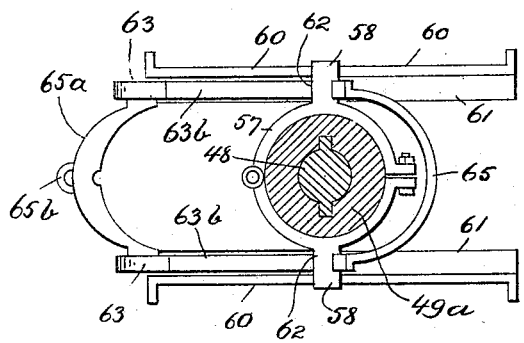
Figure 11:
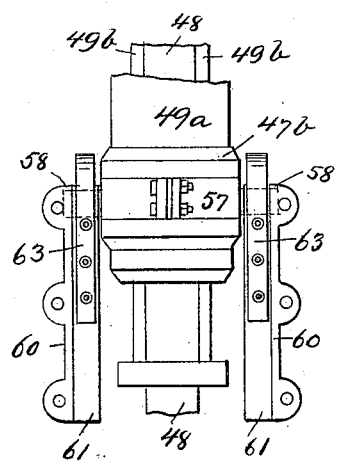

Figure 1 is a side view of my improved folding and lifting crane on a reduced scale; Fig. 2, a view of a portion of the construction shown in Fig. 1, at right angles thereto, a part thereof being shown in section; Fig. 3, a plan view of a detail of the construction shown in Fig. 1; Fig. 4, a plan view of a part of the bottom portion of the operating mechanism of the apparatus which I employ, on a larger scale than Fig. 1; Fig. 5, a bottom plan view of the bottom portion of the operative mechanism which I employ, on a smaller scale than that of Fig. 4; Fig. 6, a sectional side view of the construction shown in Fig. 4; Fig. 7, a section on the line 7 7 of Fig. 5; Fig. 8, a side view of a detail of the construction; Fig. 9, a side view of a part of the construction shown in Fig. 8; Fig. 10, a plan view of the parts shown in Figs. 8 and 9, showing said parts connected and showing other parts of the operative mechanism connected therewith; Fig. 11, an end view of the construction shown in Fig. 10; Fig. 12, a partial section on the line 12 12 of Fig. 6; Fig. 13, a sectional side view, on an enlarged scale, of a part of the construction shown in Fig. 1; Fig. 14, a view similar to Fig. 1, showing a modified form of construction; Fig. 15, a transverse section of the upper portion of the pyramidal frame shown in Fig. 14 and the parts connected therewith; Fig. 16, a plan view of the windlass mechanism which forms a part of the construction shown in Fig. 14, and Fig. 17 a sectional view of a detail of the construction shown in Fig. 14.

In the practice of my invention I provide a main truck-frame A, which consists of horizontal side bars and cross-bars $a$, and this frame is mounted on a front axle $a^2$, provided with wheels $a^3$, and a rear axle $a^4$, provided with wheels $a^5$, and the forward axle $a^2$ is provided with a circular disk, plate, or wheel $a^6$ and the forward portion of the main frame with a corresponding disk, plate, or wheel $a^7$, which rests thereon, and the forward portion of the main truck-frame is revolubly or pivotally supported on the forward axle.

Mounted on the main truck-frame is a supplemental circular wooden frame 2, on which is mounted a circular frame 3, of cast-iron, and the exterior edge of the circular frame 3 projects beyond the circular frame 2, and mounted on the supplemental circular frame 3 is a similar or auxiliary frame 5, which is also preferably composed of cast-iron, and mounted above the auxiliary circular frame 5 is a circular revoluble frame or support 7, which is composed of wood and provided with cross-bars or supports $7^a$, any desired number of which may be employed, and mounted on the revoluble circular frame 7 is a platform 8, composed of wood and which entirely covers said circular frame 7.

Secured to the perimeters of the circular frames 5 and 7 and to the perimeter of the platform 8 are metal plates 4, which are provided with angular arms 4$^b$, in which are supported rollers 4$^d$, and said rollers 4$^d$ bear on the under side of the circular frame 3 and hold the frames 3 and 5 in proper relative position, and between the frames 3 and 5 are placed a circular ball-bearing C, the grooves in which the balls are placed being formed in the bottom of the frame 5 and in the top of the frame 3, and as thus constructed it will be understood that the frame 5, to which the frame 7 and the platform 8 are secured, is free to turn on the frame 3 while being held in connection therewith.

The inner edge of the circular frame 5 projects toward the middle of the circle formed thereby and beyond the inner edge of the frame 3, and formed on the under side of the interior portion of the frame 5 are radial gear-teeth 6.

Mounted on the platform 8, which is supported by the circular frame 7 and the cross-braces 7$^a$, is a pyramidal frame 9, composed of wood or iron posts and cross-braces, and the said frame or main corner-posts thereof rest upon the circular frame 7 or on the platform 8, secured thereto.

The pyramidal frame 9 consists of two parts—a lower and an upper part—and the upper part is hinged to the lower part at one side thereof, as shown at 10 in Fig. 1, and said parts are adapted to be connected at the opposite side by means of any suitable form of catch or fastening device, as shown at 10$^a$, and by means of this construction it will be seen that the separate parts of the pyramidal frame 9 may be folded together when not in use for shipment or other purposes.

The upper part of the pyramidal frame 9 is provided with a strong cast-iron cap 11, into which the ends of the corner-posts of the upper section of said frame are fitted, and said cap 11 is provided with two bearings 12, as shown in Figs. 1 and 2, and passing through these bearings is a shaft 12$^a$, on which the crane or lifting-beam 13 is mounted, and this crane or lifting-beam 13 passes through a metal casing or support 14, which is provided with uprights or braces 14$^a$, with which are connected rods 15, which are also connected with the lifting beam or crane 13 at both ends thereof and centrally of the longer end, so as to give strength thereto.

It will be seen that one end of the lifting crane or beam is much longer than the other, and said lifting beam or crane is preferably composed of two parts 16 and 17, which are firmly fixed in the metal casing or support 14, and, as shown in Fig. 1, the part 16 constitutes the shorter end or arm of said lifting crane or beam and the part 17 the longer arm or end thereof, and the shorter end or arm of said lifting crane or beam is provided with a weight 16$^a$, as shown in Fig. 1, by means of which the shorter and longer arms or ends thereof are almost balanced, said longer end or arm being preferably slightly heavier than the shorter end or arm provided with the weight 16$^a$ when said longer end or arm is provided with the stacker or lifter 22, which will be hereinafter described.

In order to fold the pyramidal frame 9 for transport or shipping purposes, the beam or crane 13 is taken off. This is accomplished by means of the small crane 19, which, as shown in Figs. 1 and 2, is supported at its lower end by a bearing 20, which is connected with the upper portion of the pyramidal frame 9, and the crane is held in position by a supplemental bearing 21, through which it passes, but in which it is free to turn. After having taken off the weight 16$^a$ and the stacker and removed the upper portions of the bearings 12 the wire rope 26, which will be hereinafter described and which forms a part of the operating mechanism, is detached from the crane or beam 13 and passes over a small pulley 23$^a$, connected with the end of the crane 19, and is fastened to a ring or eye 24, formed on or secured to the upper portion of the casing or support 14, with which the beam or crane 13 is connected, and by means of the windlass mechanism 25, in which is mounted a drum 93, with which the wire rope 26 is connected, the beam or crane 13 may be lifted out of its bearings and lowered to the ground, after which the separate parts of said beam or crane may be separated from the casing or support 14, as will be readily understood, and said separate parts of said beam or crane, the casing or support 14, the weight 16$^a$, and the stacker 22 may be loaded in a car or other vehicle for transportation purposes, as may also the separate parts of the pyramidal frame 9.

The windlass mechanism 25 is situated beneath the pyramidal frame 9 on the top of the platform 8, and the separate parts of said windlass mechanism will be hereinafter explained. The said windlass mechanism is provided with the drum 93, on which the wire cord or rope 26 is wound, and said windlass mechanism is adapted to be operated by power or by hand, in the manner hereinafter described, and the wire rope or cord 26 passes around or beneath a pulley or roller 27, supported above the platform 8, as shown in Fig. 1, and connected with the shorter end or arm of the beam or crane 13 by means of a hook 28, and it will be understood that by winding the cord or rope 26 on the drum 93 the shorter end or arm of the beam or crane is lowered, while the longer end or arm thereof is lifted. The windlass mechanism is also provided with a brake in order that the movement of the longer end or arm of the beam or crane, together with the load connected therewith, may be arrested or stopped and held in any desired position or at any desired height, and in order to lower the longer end or arm of the beam or crane and the load-carrier 22, connected therewith, to the ground it is not necessary to turn the windlass mechanism in the opposite direction, the required result being accomplished by loosening the brake which operates in connection with said drum, and this result is obtained automatically.

I will now proceed to describe how the machine is operated, and will first describe the method of its operation by power and then by hand.

Mounted transversely of the bottom of the main truck-frame, at one end thereof, is a shaft 29, which is provided with a gear-wheel 30, and at the outer end thereof with a pulley or power-wheel 32, which may be connected by means of a belt with any suitable motor or power apparatus, and if an ordinary horse-power motor be employed the wheel 32 may be removed and the shaft 29 connected directly with the power-shaft of the horse-power apparatus.

Mounted longitudinally of the main truck-frame, at one side thereof, is a shaft 33, provided at its outer end with a beveled gear-wheel 31, which operates in connection with the beveled gear-wheel 30 on the shaft 29, and said shaft 33 is provided at its inner end with a beveled gear-wheel 34, which is adapted to connect with either of two similar beveled gear-wheels 35 and 36, both of which are mounted on a shaft 37, and said wheels 35 and 36 are mounted on a sleeve which slides on the shaft 37 and which is adapted to be operated by a lever 38, and by means of said lever either of said wheels 35 and 36 may be thrown into gear with the wheel 34, and when the sleeve on which the wheels 35 and 36 are operated is in its middle position both of said wheels are out of gear or disconnected from the wheel 34, and the shaft 33 may be turned without operating the shaft 37; but when the wheel 35 is in gear with the wheel 34 the shaft 37 will move in one direction, and when the wheel 36 is in gear with the wheel 34 the shaft 37 will move in the opposite direction.

Directly over the shaft 37 is another shaft 39, and said shaft 39 is geared in connection with the shaft 37 by means of a drive-chain 40, which is mounted on sprocket-wheels on said shafts. It will be understood that the shaft 39 moves with the shaft 37 and in the same direction, and the outer end of the shaft 39 is provided with a beveled gear-wheel 41, which operates in connection with the gear-teeth 6 on the bottom of the circular frame 5, and it will be apparent that when the beveled gear-wheels 35 and 36 are thrown into gear with the beveled gear-wheel 34 the platform, with the upper structure, or the pyramidal frame 9, mounted thereon, will be moved to the right or to the left, the direction of said movement depending upon which of said wheels 35 and 36 is thrown into gear with the wheel 34, and this result is accomplished by means of the lever 38 being moved backward or forward.

If the gear-wheels 35 and 36 are provided with gear-teeth in the usual manner, the operation of the device might be interfered with or portions of the apparatus broken when said gear-wheels, or either of them, are thrown into connection with the beveled gear-wheel 34, and in order to avoid this the beveled surfaces of the gear-wheels 34, 35, and 36 may be formed without teeth, so as to operate by friction, and by thus forming said beveled gear-wheels the danger of breaking the same or other parts of the apparatus, especially when heavy loads are being handled, will be avoided, and the upper portion of the apparatus being supported on the ball-bearings C turns very smoothly and evenly and without undue friction, and the wheels 34, 35, and 36 may thus be provided with friction-surfaces without interfering with the operation of the apparatus.

The shaft 29 is also provided with a sprocket-wheel 42 and the shaft 37 with a sprocket-wheel 44, and these sprocket-wheels are connected by a drive-chain 43, and said shaft 37 consists of two parts, the adjacent ends of which are provided with interlocking coupling heads or clutches 45, as shown in Fig. 7, the function of which will be explained hereinafter; but when the machine is driven by steam-power, horse-power, or other power, with the exception of hand-power, the separate parts of the shaft 37 are always disconnected, so that each part moves independently of the other. The shaft 29 when driven by power other than hand turns incessantly, and of course that part of the shaft 37 which is connected with the shaft 29 by means of the chain 43 will also always turn with the shaft 29, and said shaft 37 is provided at its inner end with a beveled gear-wheel 46, which connects with a corresponding beveled gear-wheel 47, which is mounted on a vertical shaft 48, to which it is secured.

The windlass mechanism is operated by the shaft 48, and by it the raising and lowering of the crane or beam 14 is effected, and said shaft 48 is also provided with two more beveled gear-wheels 49 and 50, which are connected therewith in such manner that they are free to slide vertically thereon, but are compelled to turn therewith. This mechanism is best shown in Fig. 6, and on an examination of said figure it will be seen that the beveled gear-wheel 49 is formed on or secured to a sleeve 49$^a$, which is free to slide on the shaft 48, and said shaft is provided on its opposite sides with longitudinal beads 49$^b$, which move in corresponding grooves formed in the opposite sides of said sleeve, and the gear-wheel 50 is mounted on the shaft 48, above the upper end of the sleeve 49$^a$, and the central bore of said gear-wheel is also provided with grooves, which correspond with the beads 49$^b$ on said shaft 48. The sleeve 49$^a$, the gear-wheel 49, connected therewith, and the gear-wheel 50 are moved up and down by means of a simple apparatus of which a lever 68 forms a part, said lever 68 being connected with the circular frame 2, as shown in Figs. 7 and 5, and adjacent to the free end of the lever 38, this arrangement being provided in order that the apparatus may be operated by hand.

On referring to Figs. 4 and 7 it will be seen that another shaft 51 is mounted in bearings 51ª, which are suspended from the cross-braces 7ª of the upper frame 7, and said shaft 51 is provided with a gear-wheel 52, which operates in connection with the gear-wheel 49, mounted on the shaft 48, when the said gear-wheel 49 is in its lowest position, and the said shaft 51 is also geared in connection with a shaft 56 of the windlass mechanism, as shown in Figs. 4 and 7, by means of a sprocket-wheel 53 on the shaft 51 and a corresponding sprocket-wheel 54, mounted on the shaft 56, and a drive-chain 55, by means of which said sprocket-wheels are connected, and the said shaft 56 forms a part of the windlass mechanism, and said shaft is also kept in connection as long as the wheels 49 and 59 are in gear with each other, and when said wheels are in gear and the apparatus is in operation the drum 93 will be operated so as to wind the rope or cord 26 thereon and draw down the shorter end of the crane or beam 13, and in order to stop this motion of said parts it is only necessary to put the wheels 49 and 52 out of gear, and this operation is accomplished by means of the following-described mechanism:

The lower end of the shaft 48 is supported in a socket 48ª, which is suspended from the bottom of the main truck-frame by brace-rods or hangers 48ᵇ, and secured in the main truck-frame A or that portion thereof through which the vertical shaft 48 passes is a frame consisting of two triangular side plates 60, this construction being best shown in Figs. 7 to 11, inclusive, and said apparatus being also shown in section in Fig. 6, and formed centrally of the upper horizontal sides of said triangular side plates are deep transverse slots 62, and mounted between said triangular side plates 60 is a yoke-shaped frame consisting of side plates 63, which are connected at their rear ends by a circular plate 65, and I also provide a clamp-ring 57, which is provided with side trunnions 58, which enter the slots 62, and said clamp-ring 57 is composed of two separate parts and is adapted to fit in an annular groove 57ª, formed in the lower end of the sleeve 49ª, the lower end of said sleeve being enlarged, as shown at 47ᵇ. The side plates 63 of said yoke-shaped frame are also inclined on their under surfaces, as shown at 63ª in Fig. 4, and said side plates are connected at their forward ends by a cross-head 65ª, as shown in Fig. 10, and this cross-head is provided with an eye or ring 65ᵇ, and the triangular side plates 60 in which said yoke-shaped frame is mounted rest upon inwardly-directed flanges 61, formed on the lower inclined sides of said triangular side plates 60, and the yoke-shaped frame, consisting of the triangular side plates 63, the circular plates 65, and the cross-head 65ª, is adapted to slide on said inwardly-directed flanges 61, and each of the side plates 63 is cut away longitudinally of the upper side thereof to form a longitudinal space 63ᵇ, and the ends of these spaces are shown at 63ᵈ, and the trunnions 58 are adapted to move in these spaces 63ᵇ. The circular end plates 65 by which the side plates 63 of said yoke-shaped frame are connected are removed in Fig. 11, so as to better show the construction, and the said yoke-shaped frame is moved forwardly or raised to its highest position.

The inclination of the lower sides of the plates 60 and the plates 63 form an angle of about thirty degrees to the plane of the main truck-frame, and it will be observed that the sleeve 49ª, the beveled gear-wheel 49, mounted on or secured thereto, and the beveled gear-wheel 50 are also supported by the sliding yoke-shaped frame consisting of the side plates 63, and by moving said yoke-shaped frame forwardly the said sleeve and the said gear-wheel may be raised, and when said yoke-shaped frame is moved backwardly said wheels and said sleeve will be lowered, and in this operation the beveled gear-wheel 50 falls by gravity, but is moved upwardly by the sleeve 49ª.

The yoke-shaped frame hereinbefore referred to, and consisting of the side plates 63, the circular plates 65, and the cross-head 65ª, constitutes a slide by means of which the sleeve 49ª, the beveled gear-wheel 49, and the beveled gear-wheel 50 are operated, as described; and in order to operate said slide I connect with the cross-head 65ª or the eye or ring 65ᵇ, secured thereto, one end of a rope 67, and said rope is also connected with the lever 68, hereinbefore referred to, and by moving said lever outwardly the said slide will be moved forwardly and the gear-wheels 49 and 50 raised, and when the lever 68 is released the said slide will move backwardly by gravity and the said gear-wheels will be lowered.

In practice in order to separate the wheel 49 from the wheel 52 it is only necessary to raise the wheel 49 two centimeters or thereabout, this distance depending upon the depth of the teeth of said wheels; but it is also necessary in practice to construct the apparatus so that the wheel 49 may be raised three times this distance, or six centimeters, the reason of which I will now explain.

Suppose the stacker or load-carrier 22 has been lifted to the required height and the crane or beam 13 is to be turned, with the load suspended therefrom, through a space of one hundred and twenty degrees in a horizontal plane. The first thing to be done is to put the windlass mechanism out of connection with the shaft 51, and this is done by elevating the wheel 49 through two centimeters or thereabout, as hereinbefore described; but after having done this the weight of the stacker or load-carrier and the load connected therewith would instantly pull said stacker or load-carrier to the ground, this resulting in reversing the movement of the windlass mechanism by reason of the fact that the wheels 49 and 52 being out of gear there is no resistance which prevents the stacker or load-carrier from falling; and in order to prevent this operation of the parts the brake mechanism hereinbefore referred to is provided. This brake enters into action when the wheel 49 is raised more than two centimeters, or thereabout, and said brake is of the following construction:

Pivotally connected with the bottom of the platform 8 at one side of and below the windlass mechanism, as shown at 71 in Fig. 6, is a lever 70, consisting of three parts M, N, and O, and the distance from the pivotal point 71 of said lever to the outer end of the part O of said lever, where it is connected with the brake 69, as shown at $O^2$, is twice the distance from the pivotal point 71 to the outer end of the part M, and the said outer end of the part M is connected with the upper end of the sleeve $49^a$ by means of a collar or band $m$, which is composed of two parts, as shown in Fig. 12, said parts being hinged together at $m^2$ and connected at their opposite sides by a bolt or other device $m^3$, and the said collar or band fits in a groove $m^4$, formed in said sleeve $49^a$, and the outer end of the part M of the said lever 70 is provided with a yoke $m^5$, the opposite sides of which are pivotally connected with the opposite sides of the collar or band $m$, as shown at $m^6$, this construction being best shown in Figs. 6 and 12. The part M of the lever 70 is also composed of two parts, as shown in Fig. 4, said parts being rigidly connected by a sleeve $M^2$, through which the pivot-pin 71 passes, and connected with the outer end of the part O of the lever 70 or formed thereon is an angular arm $O^3$, and the brake 69 is connected with the part O of said lever on the same shaft as the drum 93 and revolves therewith, and the opposite end of said brake is connected with a standard $26^b$, which is secured to the platform 8, as shown in Fig. 6, and the said brake 69 consists of a band of spring-steel. The part N of the lever 70 is hinged to the part M at $n$, and the part O of said lever is hinged to the part N at $n^2$, and when the wheel 49 is raised the outer end of the part M of said lever is also raised, and the part O of said lever is depressed through twice the space that the outer end of the part M is raised. These parts are so constructed that the brake 69 will not act on the drum 94 until the wheel 49 is raised more than two centimeters, or as long as the wheels 49 and 52 are in connection, and during the first part of the operation of the lever 70 or the separate parts thereof the outer end of the part N of said lever and the upper surface of the part 10 are brought together, and only when the wheel 49 is raised, so as to disconnect it from the wheel 52, does the brake begin to work, and when the wheel 49 is raised an additional space of two centimeters, or four centimeters in all, the tension of the brake has reached its extreme point and said brake would be broken if the outer end of the part M of said lever were lifted farther unless devices were provided to prevent this result; and in order to prevent the brake from being broken I connect the parts M and N of said lever by means of springs $70^a$, two of which are preferably provided, or a single strong spiral spring, the ends of which are connected, may be employed, in which event said parts M and N of the lever 70 will be passed therethrough. These springs render it possible to raise the outer end of the lever 70 or the part M thereof through another space of two centimeters, thus making six centimeters in all and thus allowing the adjacent edges of the parts M and N of said lever to separate and yet keep the brake under high pressure.

The pressure of the brake 69 on the drum 94 of the windlass mechanism reaches its extreme point when the outer end of the lever 70 has been raised four centimeters; but it is sometimes necessary to raise said lever farther, and the reason for this I will now explain, and in doing so I will first describe the construction and operation of the stacker or load-carrier 22.

The stacker or load-carrier consists of a plurality of claw-shaped hooks $22^a$, four of which are shown, and these claw-shaped hooks or arms $22^a$ are pivotally connected with a circular head or ring $22^b$, which is provided with shoulders or projections $22^d$, between which said claw-shaped hooks are pivoted near their upper ends, and the lower ends of said claw-shaped hooks or arms are adapted to drop together by gravity or into the position shown in Figs. 1 and 13.

The head or ring $22^b$ of the stacker or load-carrier is connected with the crane or beam 13 by means of chains $13^a$, which are connected with another chain $13^b$, as shown in Figs. 1 and 13, and said ring or head is provided with inwardly-directed arms $22^e$, which support a cross-shaped frame $22^f$, in the separate parts of which are mounted rollers or pulleys $22^g$, which correspond in number with the claw-shaped hooks or arms $22^a$.

The upper ends of the claw-shaped hooks or arms $22^a$ project above the circular head or ring $22^b$ and are curved outwardly and inwardly, as shown at $22^h$, and connected therewith are wire cords or ropes $22^k$, which are carried downwardly and inwardly beneath the rollers $22^g$ and then upwardly and connected with a wire rope or cord 76, which passes over pulleys 77, 78, 79, and 80, secured to the under side of the longer end or arm of the beam or crane 13, and over another pulley 81 at the upper end of the pyramidal frame 9 and then downwardly through said pyramidal frame and connected with a lever 82, which is pivoted at $82^a$ and with the outer end of which is connected a rod 83, the lower end of which is connected with a crank 84, which is secured to a shaft 85, which is supported in bearings 86 and 87, which are mounted on the platform 8, this construction being best shown in Figs. 1 and 4, and the shaft 85 is provided with a beveled gear-wheel 88, which operates in connection with the beveled gear-wheel 50 on the shaft 48 when said beveled gear-wheel is raised, as hereinbefore described.

It will be understood that when the wheel 88 turns the crank 84 turns therewith, and this operation raises and lowers the longer arm of the lever 82, with which the rope or cord 76 is connected, and this operation results in opening and closing the claws or arms $22^a$ of the stacker or load-carrier 22.

When the gear-wheel 50 on the shaft 48, which always moves up and down with the wheel 49 when the latter is raised or lowered, is raised more than four centimeters, it connects with the wheel 88, thus operating the stacker or load-carrier 22 and opening or closing the claws or arms thereof, and in order to obtain exact results and to raise the wheel 49 no more and no less than the required amount the lever 68, by means of which the slide which supports the sleeve $49^a$ is operated, is provided with a segmental attachment 89, which is provided with four notches or recesses $89^a$, and said lever 68 is provided with a sliding spring-operated rod $68^a$, which is adapted to engage with said notches or recesses, this construction being of well-known form and forming no part of this invention, and by means of this construction the lever 68 may be operated to raise or lower the sleeve $49^a$ and the wheels 49 and 50 through two, four, or six centimeters, as may be desired, and the notches or recesses $89^a$ may be numbered "1," "2," "4," and "6," beginning with the one adjacent to the lever 68, when in the position shown in Fig. 7, if desired.

When the wheels 49 and 52 are in gear, the drum 93 of the windlass mechanism will be operated so as to wind the cord 26 thereon, and consequently the shorter end or arm of the crane or beam 13 will be drawn down and the longer end or arm thereof will be raised or lifted.

When the wheels 49 and 52 are in connection, as above described, the lever 68 occupies the position shown in Fig. 7 and the spring-operated rod 68 is engaged with the first notch or recess $89^a$, and in this position of the parts the longer arm of the beam or crane 13 may be raised to the highest point. In order to disconnect the wheels 49 and 52, so that the stacker or load-carrier may be lowered, the lever 68 is moved outwardly one space, so that the rod $68^a$ will engage with the second notch or recess $89^a$. This movement of the lever 68 will separate the gear-wheels 49 and 52 and will stop the movement of the drum 93, but the brake 69 is not thrown into operation and the longer arm of the crane or beam 13 is free to descend. By moving the lever 68 outwardly through another space, or so that the rod $68^a$ will engage with the third notch or recess $89^a$, the brake will be brought into action, and the wheels 49 and 50 will be raised still higher, and the longer arm or end of the crane or beam 13 may be held in any desired position. By moving the lever 68 outwardly until the rod $68^a$ engages with the last notch or recess $89^a$ the wheel 50 will be raised until it engages with the wheel 88 on the shaft 85, and the crank 84 will be operated, and the rod 83, which is connected therewith, will operate the lever 82, and the longer end of said lever will be raised and lowered, and this operation will result in opening or closing the claws or arms $22^a$ of the stacker or load-carrier.

The foregoing describes accurately the operation of the apparatus when driven by power other than hand-power, and I will now proceed to describe the operation of said apparatus when driven or operated by hand-power. For this purpose it is necessary to first take off the chain 43 and to join the separate parts of the coupling-shaft 37 by means of the coupling-heads 45 and to provide the shaft 90 of the windlass mechanism with a crank or cranks at one or both ends thereof. The connection between the lever 82 and the crank 84 is then broken by taking off the rod 83, and the lever 68 is connected with the first notch or recess $89^a$ in the segmental rack 89, as shown in Fig. 7, where it remains as long as the machine is driven by hand.

Referring to Figs. 4, 6, and 7, it will be seen that the windlass mechanism is provided with three shafts, said shafts being designated by the reference-numerals 56, 90, and 91, and the drums 93 and 94, mounted on the shaft 91, and between said drums is mounted a large gear-wheel 92. The shaft 56 is provided with a gear-wheel 95, which revolves therewith and which operates in connection with a corresponding gear-wheel 96 on the shaft 90, and said wheel 96 may be shifted longitudinally of the shaft 90 by a lever 98, and the lever 98 is connected with the hub of the wheel 96, as shown in Fig. 4, at $98^a$ in a well-known manner. The shaft 90 is also provided with another wheel 97 similar to the wheel 96, and the wheel 97 is longitudinally movable on the shaft 90 by means of a lever 99, which is connected with the hub of said wheel, as shown at $97^a$, and the wheel 97 engages with and operates in connection with the wheel 92, and it will thus be seen that each of these wheels 96 and 97 may be put out of and into gear with the corresponding wheels 95 and 92, and when the apparatus is driven by power other than hand-power the wheel 96 is also in gear with the wheel 95 and the wheel 97 with the wheel 92. When said apparatus is operated by hand, however, the cranks $90^a$ are secured to the ends of the shafts 90, and said shaft is operated by two men, who stand on the platform. The wheel 96 is put out of gear with the wheel 95 by means of the lever 98, and the windlass mechanism is put in operation by means of the cranks connected with the shaft 90, and, supposing the stacker or load-carrier 22 to be upon the ground, the necessary load of straw or other material is connected therewith by operating the lever 82 by means of a hanger 101, connected therewith, this operation being accomplished by pulling downwardly on the hanger 101, so as to open the claws or arms $22^a$ of the stacker or load-carrier, and then by releasing said hanger the said claws or arms $22^a$ will operate by gravity to grasp and hold the load. The gear-wheel 97 is in connection with the gear-wheel 92, and by turning the shaft 90, by means of the cranks $90^a$, the cord or rope 26 will draw down the shorter end of the arm or crane and raise the load to the required height, and when the said load has been raised to the required height the operation of the windlass is arrested and the load may be discharged or dropped from the stacker or carrier by pulling on the hanger 101, connected with the lever 82. It is sometimes necessary to turn or swing the crane or beam 13 in a horizontal plane, however, before dropping the load, and this is accomplished by throwing the gear-wheels 92 and 97 out of gear and reconnecting the gear-wheels 95 and 96, and then by turning the shaft 90 the shaft 51 will be operated by the chain 55, the shaft 48 will be operated by the shaft 51, the shaft 37 will be operated by the shaft 48, and the shaft 39 will turn the frames 5 and 7 and the platform 8, and this operation will carry around the pyramidal frame 9 and the beam or crane connected therewith. The movement of the drum 93 of the windlass mechanism may be controlled by the brake hereinbefore described, and the movement of said drum may also be stopped or arrested by means of the arresting device S, (shown in Fig. 7,) which consists of a ratchet-wheel $S^2$, mounted on the shaft of said drum, and a pawl $S^3$, which operates in connection therewith, and it will be understood that the beam or crane 13 may be turned in either direction according to the direction in which the shaft 90 is turned. After having raised the load and turned the crane as described, if turning be necessary, and after the load has been dropped from the stacker or carrier the crane or beam 13 is again turned by reversing the operation of the parts, as hereinbefore described, and lowered, so that the stacker or carrier may be caused to grasp another load, and the lowering of said stacker or load-carrier is accomplished by operating the arresting device S, and in order to prevent the stacker or carrier from falling too quickly the brake mechanism, in connection with the drum 94, is operated.

Where the device is intended for use in stacking straw, hay, and other material or for lifting and moving light loads, the proportions of the various parts of the windlass mechanism are so calculated that the apparatus may be operated easily by two men; but it may be necessary to so alter the apparatus that heavier weights may be raised or moved thereby by means of hand-power, and for this purpose the wire rope or cord 26, instead of being connected with the hook 23, is passed around a pulley 102, which is also secured to the shorter end of the beam or crane 13, and then carried downwardly and connected with another hook 103, which is secured to the platform 8, and by means of this construction the crane or beam 13 may be operated much more easily and greater loads may be raised thereby than when the cord or rope 26 is connected with the hook 23, as shown in full lines in Fig. 1. Again, if it is necessary or desirable at any time to move heavy loads without raising or lowering the longer end or arm of the crane or beam 13, the shorter end thereof may be secured to the base of the pyramidal frame 9 by means of a rod or rods 104 and by supporting the longer end of said beam or crane by means of a similar rod or rods 105, which are secured to the pyramidal frame and to said beam or crane in any desired manner. In this case the stacker or load-carrier and the wire rope or cord 76 may be taken off, and the wire rope or cord 26 is passed directly from the drum 93 through the top of the pyramidal frame 9, as shown in dotted lines at 130 in Fig. 1, and over the pulleys or rollers 81, 80, 79, 78, and 77 at the end of the longer arm of the crane or beam, and if a greater outlay of power is necessary at any time the said cord or rope 26 may be suspended from either of the pulleys 78, 79, or 80 or any other point along the said beam or crane, and the said cord or rope is provided with a pulley-block 106, and the end thereof is carried upwardly, as shown at 107, and connected with the hook or other fastening device 151, which may be secured to said crane or beam at any desired point, and it will be understood that the pulley-block 103 is used for the purpose of connecting the load to be lifted with the crane or beam and is provided with the usual hook or other device 108.

It will be apparent that the apparatus herein described may be so built or constructed as to be of any desired height and strength, and it will also be apparent that many changes in and modifications of the construction hereinbefore described may be made without departing from the spirit of my invention or sacrificing its advantages.

In Figs. 14 to 17, inclusive, I have shown a modified form of construction in which I employ the main truck-frame A, which is mounted on axles provided with wheels, as hereinbefore described, and the principle of the apparatus shown in these figures is the same as that shown in Fig. 1, but is simpler in construction and smaller and lighter and is designed for use principally in raising or moving light loads. In Fig. 14 the pyramidal frame 9 is shown as consisting of a single structure; but said frame may be composed of two parts hinged together, as shown in Fig. 1, if desired, and said parts may be folded together when necessary, and the form of apparatus shown in said Figs. 15 to 17, inclusive, is particularly adapted for use where hand-power alone is employed, and the main differences between this construction and that hereinbefore described consists in the fact that the beam or crane 13 turns with the upper portion of the pyramidal frame, the base portion of which is stationary, the revoluble platform 8 being omitted, together with all the operative mechanism for use when power other than hand-power is employed. This form of apparatus consists principally of the main truck-frame A, on which the pyramidal frame 9 is mounted, and said truck-frame A is provided with a stationary platform $ab$, on which the pyramidal frame, together with the windlass mechanism 25, is placed. In this form of construction the swinging beam or crane 13 and the stacker or load-carrier, the latter being not shown, are of the same form and construction and are operated in the same manner as in the form of construction shown in Fig. 1, when said last-named construction is operated by hand, and the opening or closing of the claws or arms of the stacker or carrier is accomplished in the same manner as in the larger form of machine hereinbefore described, when the latter is operated by hand. In the modified form of construction now under consideration the top of the pyramidal frame 9 consists of a strong iron cap-plate $ac$, with the lower side of which the upper part of the pyramidal frame is connected, as shown in Figs. 14 and 15, and the cap-plate $ac$ is circular in form, and mounted thereon is a plate or disk $ad$, between which and the cap-plate $ac$ are placed ball-bearings $ae$. The disk or plate $ad$ is provided centrally with a depending tube $af$, which extends downwardly through the cap-plate $ac$, and mounted on said tube, below the cap-plate $ac$, is a double pulley $ag$, which is held in place by a nut $ah$, and mounted on the disk or plate $ad$, at each side of the tube $af$, are pulleys $ah$ and $ak$, and between the cap-plate $ac$ and the double pulley $ag$ is also placed a circular ball-bearing, as shown at $am$. The bearings for the casing 14, in which the beam or crane 13 is mounted, are formed on or supported by the disk or plate $ad$, and supported at one side of the double pulley $ag$ are two pulleys $an$. In this form of construction the lever 82 is also employed, and the cord 76 is connected therewith, as hereinbefore described. The cord 26 and the drum 93 are also employed, and the cord 26 is carried upwardly through the upper portion of the pyramidal frame 9 and passed over the pulley $ak$ and then over a pulley $ao$, secured to the rear portion of the casing 14, and mounted on the lower portion of the pyramidal frame 9 and rigidly secured thereto and inclosing said frame and the windlass mechanism is a circular frame $ba$, which is composed of angle-iron or U-shaped in cross-section, the flanges or rims at the side thereof being directed downwardly, as shown in Fig. 17; and I also provide a traveler $bc$, which is of the form shown in Fig. 17 and which carries two rollers $be$, one of which bears upon the upper portion of the circular frame $ba$ and the other of which bears on the under portion thereof between the downwardly-directed flanges, and the traveler $bc$ is provided with a pulley $bf$, around which the cord or rope 26 is passed, and the end of said cord or rope is connected with the hook or similar device 23, secured to the end of the beam or crane 13. The cord or rope 26 is wound on the drum 93, as in the construction hereinbefore described, and in the modified form of construction now under consideration I also employ two supplemental cords or ropes $bg$ and $bh$, and the cord or rope $bg$ is passed over the upper pulley $an$ and connected with the upper part of the double pulley $ag$, and the cord or rope $bh$ is passed over the lower pulley $an$ and connected with the lower part of said double pulley $ag$, and one of these cords or ropes extends around the double pulley to the right and the other to the left. In this form of construction the windlass mechanism is also provided with three shafts 56, 90, and 91, and the shaft 90 is arranged vertically over the shaft 91, and the shaft 90 is also provided with the cranks $90^a$. The shaft 56 in this construction is provided with two pulleys $bk$ and $bm$, and the cord or rope $bg$ is secured to the pulley $bk$ and the cord or rope $bh$ to the pulley $bm$. Mounted on the shaft 90 is a tubular sleeve $bn$, to which the gear-wheel 97 is secured, and said shaft is provided with ribs at its opposite sides, and said sleeve is free to slide on said shaft, but cannot turn thereon, and the lever 99 is connected with said sleeve, and by means of said lever said sleeve and the wheel 97 may be operated, so that the wheel 97 may be thrown into connection with a gear-wheel $bo$ on the shaft 56 or into connection with the gear-wheel 92, which is the same as the gear-wheel 92 in the construction hereinbefore described. In this form of construction the brake-drum 94 is also employed and provided with the brake-band 69, and said brake-band is operated by a lever $ca$, which is shown in Fig. 14; but in this form of construction said lever is pivotally connected with the platform $ab$, and the operation thereof may be regulated step by step, as hereinbefore described and as shown in Fig. 7, but the lever 70 and all the parts connected therewith are, as will be understood, omitted.

The operation of the modification will be readily understood from the foregoing description when taken in connection with the accompanying drawings and the following statement thereof. The operation of the cord or rope 76 and the stacker or load-carrier is the same as hereinbefore described, and when the gear-wheel 97 is in gear with the wheel 92 the operation of the shaft 91 by means of the cranks 90ª will turn the drum 93 and wind the cord 26 thereon, and this cord will draw down the shorter end of the beam or crane 13, as will be readily understood, and by this operation the load may be raised to the desired height. In order to turn the crane or beam 13 and to carry the load to any particular point, the connection between the wheel 97 and the wheel 92 is broken, and said wheel 97 is thrown into gear with the wheel $bo$, and by continuing to revolve the shaft 90 by means of the cranks 90ª the cords $bg$ and $bh$, respectively, will be wound and rewound on their respective pulleys $bk$ and $bm$, the winding and unwinding of these cords depending on the direction in which the shaft 90 is turned, and this operation will turn the disk or plate $ad$ and with it the crane or beam 13, and it will be understood that said crane or beam may thus be turned in either direction, the direction of its movement depending on the direction of the movement of the shaft 90. The operation of discharging the load from the stacker or carrier 22 is the same as in the construction hereinbefore described when said construction is operated by hand, and in order to hold the crane or beam 13 at any desired point in the vertical movement thereof the lever $ca$ is manipulated in the same manner as the lever 68 in the construction shown in Fig. 7.

The apparatus when constructed as shown in Figs. 14 to 17, inclusive, may be operated by two men, and the apparatus as shown in Figs. 1 to 13, inclusive, may also, when operated by hand, as described, be managed or operated by two men, and it will be apparent that other changes in and modifications of the construction herein described may be made without departing from the spirit of my invention or sacrificing its advantages.

Having fully described my invention, I claim as new and desire to secure by Letters Patent—

1. A portable lifting or hoisting apparatus, consisting of a stationary frame mounted on a truck, a pyramidal frame or support mounted thereon, a beam or crane mounted on said pyramidal frame or support, and adapted to swing in horizontal and vertical planes, one end of said beam or crane being longer than the other, a load-carrier connected with the longer end of said beam or crane, a windlass mechanism mounted on said truck-frame, a shaft which forms a part of said windlass mechanism, a brake-drum mounted on said shaft, a brake connected therewith, another drum mounted on said shaft and provided with a cord or rope which is wound thereon, said cord or rope being in operative connection with the shorter end of said beam or crane, another cord or rope connected with the load-carrier, and extending along the longer end of said beam or crane, and passing downwardly through said pyramidal frame or support, and devices for operating said brake, and the rope or cord connected with the load-carrier, substantially as shown and described.

2. A portable lifting or hoisting apparatus, consisting of a stationary frame mounted on a truck, a pyramidal frame or support mounted thereon, a beam or crane mounted on said pyramidal frame or support, and adapted to swing in horizontal and vertical planes, one end of said beam or crane being longer than the other, a load-carrier connected with the longer end of said beam or crane, a windlass mechanism mounted on said truck-frame, a shaft which forms a part of said windlass mechanism, a brake-drum mounted on said shaft, a brake connected therewith, another drum mounted on said shaft and provided with a cord or rope which is wound thereon, said cord or rope being in operative connection with the shorter end of said beam or crane, another cord or rope connected with the load-carrier, and extending along the longer end of said beam or crane, and passing downwardly through said pyramidal frame or support, and devices for operating said brake, and the rope or cord connected with the load-carrier, and devices for turning said beam or crane horizontally, which are in operative connection with the windlass mechanism, substantially as shown and described.

3. A portable lifting or hoisting apparatus, consisting of a stationary frame mounted on a truck, a pyramidal frame or support mounted thereon, a beam or crane mounted on said pyramidal frame or support, and adapted to swing in horizontal and vertical planes, one end of said beam or crane being longer than the other, a load-carrier connected with the longer end of said beam or crane, a windlass mechanism mounted on said truck-frame, a shaft which forms a part of said windlass mechanism, a brake-drum mounted on said shaft, a brake connected therewith, another drum mounted on said shaft and provided with a cord or rope which is wound thereon, said cord or rope being in operative connection with the shorter end of said beam or crane, another cord or rope connected with the load-carrier, and extending along the upper end of said beam or crane, and passing downwardly through said pyramidal frame or support, and devices for operating said brake, and the rope or cord connected with the load-carrier, and devices for turning said beam or crane horizontally, which are in operative connection with the windlass mechanism, and said beam or crane being connected with a casing which is pivotally supported on said pyramidal frame or support, and said casing being provided with a frame consisting of upright braces with which are connected rods, which are connected with the opposite ends of said beam or crane, substantially as shown and described.

4. A portable hoisting or lifting apparatus, consisting of a truck, a stationary frame mounted thereon, a revoluble frame mounted on said stationary frame, a pyramidal frame or support mounted on said revoluble frame, a crane or beam pivotally supported on said pyramidal frame or support, and adapted to swing vertically thereon, and one end of which is longer than the other, a windlass mechanism mounted on said revoluble frame within the base of the pyramidal frame or support, a load-carrier connected with the longer end of said beam or crane, and provided with claws or arms, a shaft which forms a part of the windlass mechanism, and which is provided with two drums, one of which is provided with a cord or rope which is in operative connection with the shorter arm of said beam or crane, and the other with a brake, a cord or rope connected with the arms or claws of the load-carrier, and extending downwardly into said pyramidal frame or support, and means for operating said shaft on which said drums are mounted, and devices connected with said windlass mechanism for turning said revoluble frame, substantially as shown and described.

5. A portable crane or hoisting apparatus, consisting of a truck, a main frame mounted thereon, a revoluble frame mounted on said main frame, a pyramidal frame or support mounted on said revoluble frame, a beam or crane mounted on said pyramidal frame or support, and adapted to swing in a vertical plane, and one end of which is longer than the other, a load-carrier connected with the longer end of said beam or support, a windlass mechanism mounted on said revoluble frame, within the base of said pyramidal frame or support, and operative devices connected with said windlass mechanism, and said load-carrier, and devices connected with said windlass mechanism for turning said revoluble frame, substantially as shown and described.

6. A portable hoisting apparatus, consisting of a truck, a stationary frame mounted thereon, a revoluble frame mounted on said stationary frame, an upright frame or support mounted on said revoluble frame, a crane or beam mounted on said upright frame or support, and adapted to swing in a vertical plane, a windlass mechanism mounted on said revoluble frame within the base of said upright frame or support, a load-carrier connected with the longer end of said crane or beam, devices connected with said windlass mechanism for operating said load-carrier, and devices connected with said windlass mechanism and with said stationary frame for turning said revoluble frame, substantially as shown and described.

7. A portable hoisting apparatus, comprising a truck, a stationary frame mounted on said truck, a revoluble frame mounted on said stationary frame, an upright frame or support mounted on said revoluble frame, a crane or beam mounted on said upright frame or support, and adapted to swing in a vertical plane, and one end of which is longer than the other, a load-carrier connected with the longer end of said beam or crane, and provided with claws or arms which are adapted to close by gravity, and to which are secured cords by which they are opened, said cords being connected with another cord which extends along the longer end of said beam or crane, and which passes downwardly through said upright frame or support, a windlass mechanism mounted within the base of said upright frame or support, and on said revoluble frame, and a rope or cord connected therewith, and with the shorter end of said beam or crane, said parts being constructed, combined and operating, substantially as shown and described.

8. In a hoisting apparatus, a suitable supported stationary frame, a revoluble frame mounted thereon, an upright frame or support mounted on said revoluble frame, a crane or beam mounted on said upright frame or support, and adapted to swing in a vertical plane, and one end of which is longer than the other, a windlass mechanism mounted on the revoluble frame, and operative devices connected with the windlass mechanism for operating said beam or crane, and devices connected with said revoluble frame, said windlass mechanism, and said stationary frame for operating the revoluble frame, substantially as shown and described.

9. A hoisting or lifting apparatus, comprising a truck, a stationary frame mounted thereon, a revoluble frame mounted on said stationary frame, an upright frame or support mounted on said revoluble frame, a beam or crane mounted on said upright frame or support and adapted to swing in a vertical plane, a load-carrier connected with one end of said beam or crane, a windlass mechanism mounted on said revoluble frame within the base of the said upright frame or support, and in operative connection with said load-carrier, said windlass mechanism being also in operative connection with the end of the beam or crane opposite that with which the load-carrier is connected, a shaft mounted at one end of the stationary frame, and adapted to be operated by a power apparatus connected therewith, and devices connected with said shaft and said windlass mechanism and with said stationary frame for operating the revoluble frame, and said windlass mechanism, substantially as shown and described.

10. A hoisting apparatus comprising a truck, a stationary frame mounted thereon, a revoluble frame mounted on said stationary frame, an upright frame or support mounted on said revoluble frame, a crane or beam mounted on said upright frame or support, and adapted to swing in a vertical plane, and one end of which is longer than the other, a load-carrier connected with the longer end of said beam, a windlass mechanism mounted on the revoluble frame within the base of said upright frame or support, operative devices connecting said windlass mechanism, and said load-carrier, and also connecting said windlass mechanism, and the shorter end of said beam or crane, a shaft connected with the stationary frame and in operative connection with said windlass mechanism and said revoluble frame, a brake device connected with said windlass mechanism, and devices also connected with said windlass mechanism whereby the apparatus may be operated by hand, substantially as shown and described.

11. A hoisting apparatus comprising a stationary frame, a revoluble frame mounted thereon, an upright frame or support mounted on said revoluble frame, a beam or crane mounted on said upright frame or support, and adapted to swing in a vertical plane, said upright frame or support being composed of two parts which are hinged together at one side, and adapted to be connected at the opposite side, said beam or crane being detachable from said upright frame or support, substantially as shown and described.

12. A hoisting apparatus comprising a stationary frame, a revoluble frame mounted thereon, an upright frame or support mounted on said revoluble frame, a beam or crane mounted on said upright frame or support, and adapted to swing in a vertical plane, said upright frame or support being composed of two parts which are hinged together at one side, and adapted to be connected at the opposite side, said beam or crane being detachable from said upright frame or support, and one end of said beam or crane being longer than the other, and being provided with a load-carrier, and a windlass mechanism which is mounted on the revoluble frame, and which is in operative connection with said load-carrier, and with the shorter end of said beam or crane, and devices connected with said windlass mechanism and with the stationary frame for operating said revoluble frame and said windlass mechanism, substantially as shown and described.

13. A portable hoisting apparatus, consisting of a truck, a stationary frame mounted thereon, a revoluble frame mounted on said stationary frame and provided with a support for a crane or beam, and a windlass mechanism by which the crane or beam is operated, said stationary frame being provided at one end with a transverse shaft, a longitudinal shaft in operative connection therewith, a sectional transverse shaft, one section of which is longitudinally movable, said sections being also adapted to be geared in connection, and the longitudinally-movable section being adapted to be operated by said longitudinal shaft, a vertically-movable shaft in operative connection with said sectional shaft, and means connected with said sectional shaft and said vertically-movable shaft for turning the revoluble frame and for operating the windlass mechanism, substantially as shown and described.

14. In a hoisting apparatus, the combination with a stationary and a revoluble frame, and means for operating said revoluble frame, of a windlass mechanism mounted on said revoluble frame, a frame or support mounted on said revoluble frame, a beam or crane mounted on said frame or support, and adapted to swing in a vertical plane, a load-carrier connected with one end of said beam or crane, a drum which forms a part of said windlass mechanism and which is provided with a cord which is in operative connection with said load-carrier, and said windlass mechanism being also in operative connection with the end of the beam or crane opposite the end with which the load-carrier is connected, substantially as shown and described.

15. A hoisting apparatus consisting of a stationary frame, a revoluble frame mounted thereon, a support mounted on said revoluble frame, a beam or crane mounted on said support, and adapted to swing in a vertical plane, and a windlass mechanism mounted on said revoluble frame within the base of said support, said windlass mechanism consisting of a drum provided with a cord or rope, a brake-drum mounted on the same shaft, a gear-wheel mounted between said drums, and operative devices connected therewith, substantially as shown and described.

In testimony that I claim the foregoing as my invention I have signed my name, in presence of the subscribing witnesses, this 24th day of April, 1897.

FEDOR LOUIS.

Witnesses:
C. GERST,
A. C. VAN BLARCOM.